United States Patent
Vetter (12)

(10) Patent No.: US 6,222,721 B1
(45) Date of Patent: Apr. 24, 2001

(54) REGENERABLE CAPACITOR

(75) Inventor: Harald Vetter, Heidenheim (DE)

(73) Assignee: Siemens Matsushita Components GmbH & Co. KG, Munich (DE)

( * ) Notice: Subject to any disclaimer, the term of this patent is extended or adjusted under 35 U.S.C. 154(b) by 0 days.

(21) Appl. No.: 09/269,450

(22) PCT Filed: Aug. 7, 1997

(86) PCT No.: PCT/DE97/01665

§ 371 Date: Dec. 13, 1999

§ 102(e) Date: Dec. 13, 1999

(87) PCT Pub. No.: WO98/13839

PCT Pub. Date: Apr. 2, 1998

(30) Foreign Application Priority Data

Sep. 27, 1996 (DE) ............................................. 196 39 877

(51) Int. Cl.⁷ ........................ H01G 4/008; H01G 4/015; H01G 4/06
(52) U.S. Cl. ............................ 361/305; 361/273; 361/311
(58) Field of Search ............................. 361/301.1–301.5, 361/303, 305, 311, 323, 273

(56) References Cited

U.S. PATENT DOCUMENTS 3,644,805    2/1972  Heywang.
4,477,858 * 10/1984  Steiner ................................ 361/273
5,615,078 *  3/1997  Hudis et al. ......................... 361/313
5,708,558 *  1/1998  Dequasie ........................... 361/301.5
5,905,628 *  5/1999  Okuno et al. ....................... 361/303
6,018,454 *  1/2000  Hatada et al. ...................... 361/314

FOREIGN PATENT DOCUMENTS 28 26 481       1/1980  (DE) .
28 26 481 C2    1/1980  (DE) .
33 05 837 A1    8/1984  (DE) .
0 088 137       9/1983  (EP) .
0 640 996 A1    3/1995  (EP) .
0 677 594 A1   10/1995  (EP) .

* cited by examiner

Primary Examiner—Dean A. Reichard
Assistant Examiner—Eric Thomas
(74) Attorney, Agent, or Firm—Schiff Hardin & Waite

(57) ABSTRACT

A regenerable electric capacitor having wound-on layers of plastic foils provided with metal layers of the coatings. The metal layers consist of an alloy and include a variable thickness perpendicular to the longitudinal direction of the foils. As such, the thickness of the metal layers is smallest in the regions bordering metal-free edge strips and it increases towards the opposite side of the foil. In addition, the metal layers have an alloy composition that is different dependent transverse to the direction of run of the foils.

9 Claims, 1 Drawing Sheet

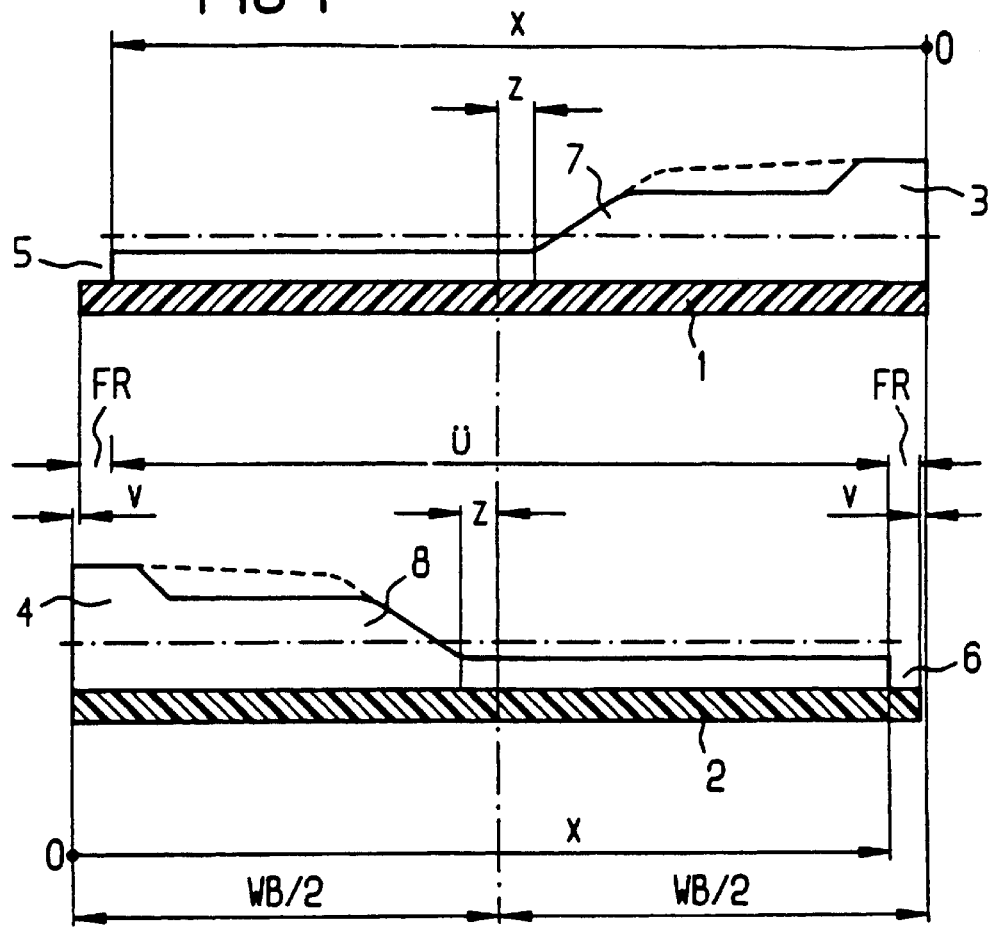
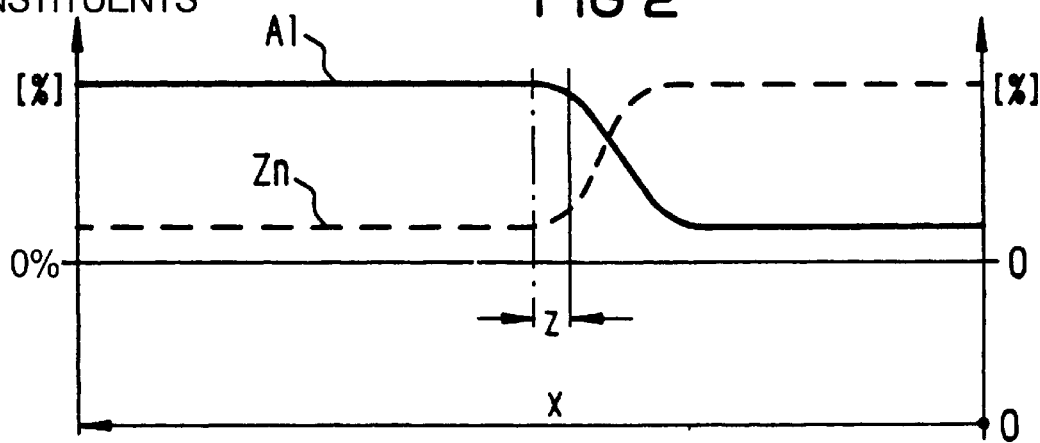

REGENERABLE CAPACITOR

This application is a 371 of PCT/DE97/01665 filed Aug. 7, 1997.

BACKGROUND OF THE INVENTION

1. Field of the Invention

The present invention relates to a regenerable electric capacitor that has metal layers that have thicknesses and alloy compositions which are different dependent transverse to a direction of run of wound-on layers of plastic foils.

2. Description of the Prior Art

The possibilities of use of power capacitors are determined essentially by their thermal characteristics. In self-healing, or regenerable, capacitors, the greatest part of the losses arises in the metal layers of the coatings.

In order to minimize the losses, the metal layers can be made thicker and the surface resistances made smaller. However, for reasons of regeneration reliability, narrow limits are placed on this procedure since, beginning at a certain thickness of the metal layers a correct regenerability is no longer ensured. It is thus generally known that the thickness of at least one metal layer must be kept thin.

Improvements have resulted by means of a capacitor of the type named above known from DE 28 26 481 C2. in the capacitor depicted there, the metal layers, consisting of an alloy of 15–80 atomic % aluminum with copper, include a variable thickness perpendicular to the longitudinal direction of the foils) i.e., transverse to the direction of run of the capacitor foil) so that the cross-sectional profile of the metal layers is essentially wedge-shaped with a constantly increasing thickness. However, with respect to the regeneration characteristic, the most unfavorable conditions hereby prevail in the center so that the minimal allowable surface resistance is determined at this point.

In addition, from EP 0 088 137 A1, a self-healing electric capacitor is known in which the metal layers consist of an Al/Zn alloy whereby the Al portion constantly decreases from 80% at the side of the metal layer facing the foil to less than 20% at the side of the metal layer facing away from the foil.

If the manufacturing of wound capacitors is regarded from an economical point of view, it is to be noted that the manufacture of larger winding units is generally more cost-effective. For this reason, it is desirable to manufacture the largest possible winding units with large overlappings of the oppositely poled metal layers. However, for the thermal economy of the capacitor there results the disadvantageous effect that the series losses increase proportionally to the size of the covering so that an optimization problem between the economical winding manufacture and the thermal requirements occurs.

An object of the present invention is, therefore, to develop a capacitor that, in comparison with the prior art, exhibits an at least equally good, but if possible a better, regeneration characteristic and an equally good, or better, life span. The operation of such capacitor should be such that minimal coating losses arise which thus enable a higher exploitation of the dielectric material as well as cost reductions.

SUMMARY OF THE INVENTION

Accordingly, in an embodiment of the present invention, a regenerable electric capacitor is provided which includes: wound-on layers of plastic foils; metal-free edge strips respectively arranged on longitudinal sides of the foils; and metal layers of the coatings respectively provided on the foils, wherein the metal layers are formed of an alloy and include a variable thickness perpendicular to a longitudinal direction of the foils, the thickness of the metal layers being smallest in regions bordering the metal-free edge strips and increasing towards an opposite foil side, the foils being would with one another such that given two foils lying on one another the metal-free edge strips are arranged on different frontal sides of the capacitor, the metal layers having a thickness and alloy composition that is different dependent transverse to a direction of run of the foils such that the thickness and the alloy composition vary from the region connected to the metal-free edge strips to the opposite foil side, and the metal layers are profiled in stepped form and are formed of a zinc/aluminum alloy in that the aluminum portion of the alloy increases from a value lower than 5% to a value higher than 10% (weight percentage).

In an embodiment, the metal layers additionally contain silver.

In an embodiment, the metal layers additionally contain copper.

In an embodiment, the metal layers additionally contain magnesium.

In an embodiment, the silver portion is contained as at least one uniformly embedded layer.

In an embodiment, the silver portion is placed in as a doping.

In an embodiment, the aluminum portion is smallest in the regions bordering the metal-free edge strips.

In an embodiment, a respective half increase of the portion of the metals of the alloy composition is achieved at a location outside a center of the foil.

In an embodiment, the metal layers form a structuring.

In an embodiment, the plastic foils are provided with a wave cut in the region connected to the metal-free edge strips.

Additional features and advantages of the present invention are described in, and will be apparent from, the Detailed Description of the Preferred Embodiments and the Drawings.

DESCRIPTION OF THE DRAWINGS

FIG. 1 shows the schematic cross section through two foil layers of the capacitor of the present invention.

FIG. 2 shows the qualitative distribution of the alloy components for the capacitor foil.

DETAILED DESCRIPTION OF THE PREFERRED EMBODIMENTS

FIG. 1 shows a cross section through two plastic foils 1, 2 lying on one another, which are respectively provided with metal layers 3, 4. The thickness of the metal layers 3, 4 is shown in distorted fashion in comparison to the thickness of the foils 1, 2. In reality, the metal layers 3, 4 are significantly thinner than the plastic foils 1, 2. The thickness of the metal layers 3, 4 is smallest in the region connected to metal-free edge strips 5, 6 and increases in stepped form towards the opposite side of the foil. At this point, the metal layers 3, 4 are thickest and are contacted with schoop layers not are shown in FIG. 1.

However, it is also possible to apply the metal layers 3, 4 in such a way that after the first step 7, 8, their thickness becomes that which is shown in dotted lines. The region in which the first step 7, 8 begins is displaced by an amount z in relation to the geometrical center (half winding width WB/2 of the foils 1, 2). In order to prevent the possibility of short-circuits between the metal layers 3, 4, the foils 1, 2 are wound on with a certain offset V to one another.

The capacitatively effective region of the capacitor is determined by the degree of overlap Ü of the metal layers 3, 4, which results from the width x of the metal layers 3, 4 minus the free edge region FR and the offset V. The surface resistance is greatest in the thin region of the metal layers 3, 4 ($R_{max}$) and is lowest in the thickest region ($R_{min}$).

FIG. 2 shows the quantitative distribution, (weight percentage), of the alloy components aluminum (Al) and zinc (Zn). The free edge region is located at the right in FIG. 2 wherein the zinc portion is greater than the aluminum portion. The composition of the alloy components is thereby selected in such a way that the higher aluminum portion is achieved approximately in the center of the foils.

In addition to the alloy components Al/Zn, the metal layers also can contain silver. The silver is present either as uniformly embedded layer(s)/blocking layer/ or as a doping portion distributed either uniformly or non-uniformly in the Al/Zn alloy.

Concerning the calculation of the cross-profiling of the metal layers as a function of x, the coating losses can be calculated with the following solution approach:

the displacement current $I_0$ that flows into the coating from the contacting per unit of length decreases proportional to x from $I_0$=max at x=0 to $I_0$=0 at x=(Ü+FR+V). In a surface element dI·xdx with the surface resistance R, the power loss P is consumed. As such, the following holds:

(1) $dP = I^2 dR$, (2) $I_x = I\dfrac{x}{ü}$, (3) $dR = \dfrac{\rho}{A} dx$

From 1 to 3 there results:

(1-3) $dP = \left(I_0 \dfrac{x}{ü}\right)^2 \dfrac{\rho}{A} dx$ (4) $P = I_0^2 \dfrac{\rho}{A\ddot{u}} \int_0^{\ddot{u}} x^2 dx = \dfrac{1}{3}\dfrac{\ddot{u}}{G_0 I} I_0^2.$ For the metal layers 3, 4 with the surface resistances $R_{3,4}$ there results the power loss:

$P_{hB} \approx \tfrac{2}{3} I_0^2 \cdot 1.00 \cdot R_{hB}$ \hfill (5)

(with $R_{hB}$=const=>homogenous coating)

$Pk_B \approx \tfrac{2}{3} I_0^2 \cdot 0.75 \cdot R_{kB}$ \hfill (6)

(with $R_{kB}=R_0+R_0 \cdot x \approx$ wedge-shaped coating)

$P_{sB} \approx \tfrac{2}{3} I_0^2 \cdot 0.40 \cdot R_{sB}$ \hfill (7)

(with $R_{sB}$, the coating profiled in stepped form according to FIG. 1, and an alloy composition as a function of x according to FIG. 2).

Equation (7) shows a significantly reduced power loss production in comparison to the known metallization profiles. Alongside an optimally constructed metallization profiling according to FIG. 1, this advantage is also effected by the modification of the main alloy components aluminum and zinc (if necessary, for example, with portions of silver) dependent on x according to FIG. 2.

The alloy composition as a function of x contributes to the solution of the underlying object of the present invention because, in particular for thin layers, the layer-thickness-related surface resistance of zinc and aluminum differs by approximately a factor of 2, i.e.; $R_{Al} < R_{Zn}$ with d=const. In addition, given the alloy metallization Zn/Al, there exists the effect that for small Al portions (approximately <5% Al) this aluminum portion acts as an imperfection in the Zn grid structure, and $R_{Zn/Al}$ is increased superproportionally to the existing layer thickness. If the aluminum portion in the thicker region of the stepped metallization is now increased to a maximum allowable value (approximately >10% Al), taking into account the requirement ΔC/C(t,T,E, . . . )=const, then the surface resistance is consequentially reduced in a manner superproportional to the existing Zn layer thickness, since beginning from a threshold value, the Al embedding in the Zn grid has a significant effect on a reduction of the surface resistance R.

The allocation of the alloy composition in the x direction also can be optimally organized according to the desired application (AC, DC, SK capacitors) from the point of view of manufacturing the metal layers. From the qualitative curve of the alloy components shown in FIG. 2, it can be seen that the distance z in relation to the midaxis is taken into account as a security overlapping of the thin coating equipped with good regeneration characteristics.

As already mentioned, the alloy metallizations also can include silver portions which, analogous to the Zn/Al alloy, can represent a function of x. Mainly in the region of the thin metallization (region $R_{max}$), advantages emerge if silver is used in increased measure since the layer-thickness-related surface resistance is reduced superproportionally and effectively. In the transition zone from thick to thin metallizations, i.e. in the region of the degree of overlap ü, silver is particularly advantageous.

The optimization of the cross-profiling also takes into account the power loss production as a function of x. The calculation of the formula (7) with different surface resistance ratios $R_{max}/R_{min}$ shows that, in particular at high $R_{max}/R_{min}$ ratios, load peaks occur in the region WB/2. On the basis of these relationships, the careful calculation or, respectively, optimization of all parameters is required in order to make effective use of the described advantages in the technical product; such as, for example, capacitor windings for AC applications with a winding width of approximately 50 mm to 170 mm.

The advantages described also result in a further improvement of, for example, capacitors with structured coatings and/or capacitor foils with a wave cut in the free edge area.

In addition, it is also possible to manufacture the described structure of the metal layers in a suitable manner as a metallization on both sides with an offset free edge. As such, the thick layer is arranged in the contact zone.

On the other hand, it is also possible to combine a very thin metallization (for example 15–30Ω) with a free edge with the structure depicted in the embodiment according to FIG. 1 on the second side of the foil.

Although other present invention has been described with reference to specific embodiments, those of skill in the art will recognize that changes may be made thereto without departing from the spirit and scope of the invention as set forth in the hereafter appended claims.

What is claimed is:

1. The regenerable electric capacitor, comprising:

wound-on layers of plastic foils;

metal-free edge strips respectively arranged on longitudinal sides of the foils; and metal layers respectively provided on the foils, wherein the metal layers are formed of an alloy having a variable thickness perpendicular to a longitudinal direction of the foils, the thickness of the metal layers being small in regions bordering the metal-free edge strips and increasing towards an opposite side of the foils where each foil has a large thickness, the foils being wound with one another such that given two foils lying on one another the metal-free edge strips are arranged on different frontal sides of the capacitor, the metal layers having a thickness and alloy composition that changes transverse to said longitudinal direction of the foils such that the thickness and the alloy composition vary from the region connected to the metal-free edge strips to the opposite side of each foil, and the metal layers are profiled in stepped form and are formed of a zinc/aluminum alloy such that a weight percentage of the aluminum portion of the alloy increases from a value less than 5% at the small side of each metal layer to a value greater than 10% at the large thickness side of each metal layer.

2. The regenerable electric capacitor as claimed in claim 1 wherein the metal layers additionally contain silver.

3. The regenerable electric capacitor as claimed in claim 2 wherein said metal layers are doped with the silver.

4. The regenerable electric capacitor as claimed in claim 1 wherein the metal layers additionally contain copper.

5. The regenerable electric capacitor as claimed in claim 1 wherein the metal layers additionally contain magnesium.

6. The regenerable electric capacitor as claimed in claim 2 wherein the silver is contain as at least one uniformly embedded layer.

7. The regenerable electric capacitor as claimed in claim 1 wherein the aluminum portion is smallest in the regions bordering the metal-free edge strips.

8. The regenerable electric capacitor as claimed in claim 1 wherein half of the increase of the aluminum weight percentage of the aluminum portion is achieved at a location adjacent to a center of each foil.

9. The regenerable electric capacitor as claimed in claim 1 wherein the metal layers exhibit a surface structure.

* * * * *